Patented Mar. 29, 1932                                              1,851,120

UNITED STATES PATENT OFFICE

RICHARD STÜSSER, OF COLOGNE-DEUTZ, GERMANY, ASSIGNOR TO GENERAL ANILINE WORKS, INC., OF NEW YORK, N. Y., A CORPORATION OF DELAWARE

AZO DYESTUFFS

No Drawing. Application filed February 16, 1928, Serial No. 254,902, and in Germany February 28, 1927.

The present invention relates to new disazodyestuffs, more particularly to dyestuffs of the general formula:

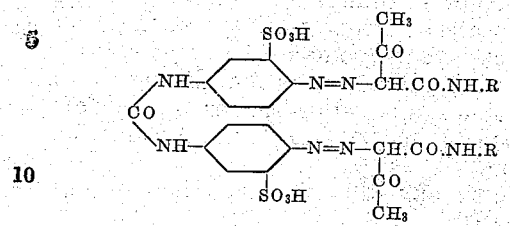

wherein R stands for a sulfonated benzene nucleus.

These dyestuffs are obtainable by coupling one molecule of tetrazotized sulfonic acids of 4.4'-diamino-diphenyl-ureas of the general formula

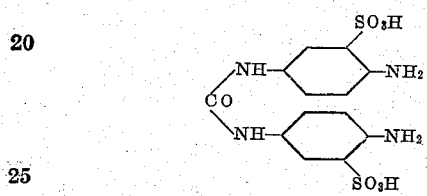

wherein the hydrogen atoms of the benzene nuclei may be replaced by alkoxy or halogen, with two molecules of a sulfonic acid of an aceto-acetic acid arylide of the general formula

wherein R stands for a sulfonated benzene nucleus, which may be otherwise substituted by alkoxy or halogen. In spite of the many sulfo groups present in the molecule, the dyestuffs are fast to water and to washing. I have further found that dyestuffs of this group can also be produced by converting for example, the monoazo dyestuffs from para phenylene diamine sulfonic acid or derivatives thereof with the sulfonic acids of aceto-acetic acid arylides into urea compounds, or by sulfonating the azo dyestuffs from para nitraniline or para nitraniline sulfonic acids with unsulfonated aceto-acetic acid arylides before or after the reduction of the nitro group and converting the same into urea compounds, or also by sulfonating the dyestuffs from 4:4'-diamino-diphenyl urea or derivatives thereof with unsulfonated acetoacetic acid arylides.

The new dyestuffs after being dried and pulverized form yellow to orange powders, easily soluble in water, sparingly in the usual organic solvents, soluble in strong sulfuric acid with a yellow coloration. They dye cotton and artificial silk bright yellow shades fast to water and washing with soap and soda solution and may also be used as lake colors and for dyeing paper.

The following examples are intended to illustrate my invention, without limiting it thereto:—

*Example 1.*—402 parts by weight of 4:4'-diamino-diphenyl-urea-3:3'-disulfonic acid are tetrazotized and coupled with 574 parts by weight of acetoacetic acid ortho anisidid sulfonic acid in a solution rendered alkaline by sodium carbonate. The dyestuff having in the free state the following formula:

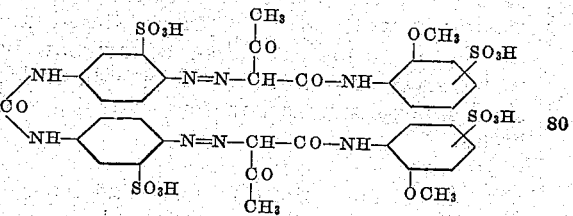

is then salted out, filtered and dried, an orange powder being obtained, which dissolves in water with a yellow coloration. Cotton is dyed a clear deep yellow, which is fast to water. On viscose silk the dyestuff gives a golden yellow, fast to water and to washing. The new dyestuff can also be precipitated on alumina, following the known methods therefor, whereby a deep yellow is likewise obtained.

*Example 2.*—402 parts by weight of 4:4'-diamino-diphenyl-urea-3.3'-disulfonic acid are tetrazotized and coupled with 581 parts of acetoacetic acid-ortho-chloranilide in a solution rendered alkaline by sodium carbonate. The dyestuff is then salted out, filtered and dried. It forms a yellow powder which dyes cotton and artificial silk yellow shades of satisfactory fastness properties.

*Example 3.*—440 parts by weight of the monoazo dyestuff from 4-nitraniline-2-sulfonic acid and acetoacetic acid-ortho-chloranilide are dissolved while cooling with ice in 4000 parts by weight of a sulfuric acid monohydrate. Then 400 parts by weight of oleum of 65% anhydride content are added and the mixture is stirred at 30 to 40° C. until sulfonation is complete. The sulfonation mixture is then poured on to ice, filtered and washed with water. The dyestuff is then dissolved in sodium carbonate and the nitro group reduced to the amino group in the known manner by means of sodium sulfide, after which the urea compound is produced from the amino azo dyestuff by passing phosgene into the aqueous solution of the dyestuff. The finished dyestuff is then filtered and dried and forms a yellow powder, which dyes cotton and artificial silk yellow shades, possessing satisfactory fastness properties.

*Example 4.*—248 parts by weight of 5-nitro-2-anisidine-4-sulfonic acid are diazotized in the customary manner in water with 69 parts by weight of sodium nitrite and 400 parts by weight of hydrochloric acid of 19½° Bé. and coupled with 287 parts by weight of aceto acetic acid-ortho-anisidid sulfonic acid, rendered alkaline by means of sodium carbonate. The dyestuff is salted out, filtered, then dissolved in water and reduced to the amino azo dyestuff with the calculated quantity of sodium sulfide in the presence of caustic soda. The amino-azo dyestuff is salted out, filtered and treated in aqueous solution with phosgene until the formation of the urea compound is complete. The resulting new dyestuff is then filtered and dried. It forms a reddish yellow powder, which dyes cotton and artificial silk yellow shades, possessing satisfactory fastness properties.

I claim:—

1. As a new product the disazo dyestuff having in its free form the probable formula

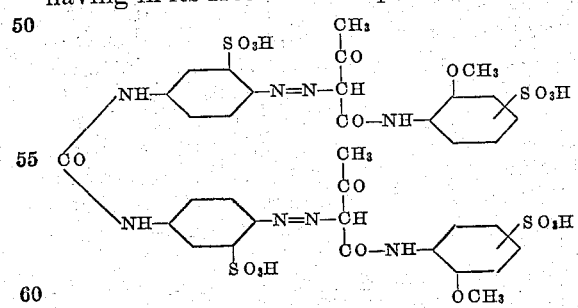

said dyestuff being in form of its alkali metal salts a yellow powder, dissolving in water and strong sulfuric acid with a yellow coloration, dyeing cotton clear yellow, viscose silk golden-yellow shades, fast to water and washing with soap and soda solution.

2. A new products disazo dyestuffs having in their free form probably the general formula:

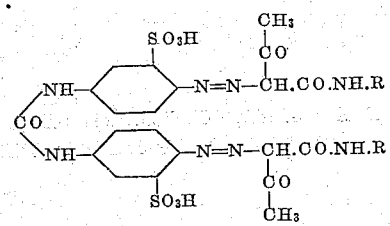

wherein R stands for a sulfonated benzene nucleus and wherein the nuclei may be further substituted by alkoxy or halogen, said products being in form of their alkali metal salts yellow to orange powders, easily soluble in water, sparingly soluble in the usual organic solvents, soluble in strong sulfuric acid with a yellow coloration, dyeing cotton and artificial silk yellow shades of good fastness to water and washing with soap and soda solution.

In testimony whereof I have hereunto set my hand.

RICHARD STÜSSER.